(12) United States Patent
Belegu

(10) Patent No.: US 9,663,043 B2
(45) Date of Patent: May 30, 2017

(54) ELECTRONIC LICENSE PLATES FOR VEHICLES

(71) Applicant: Klodian Belegu, Toms River, NJ (US)

(72) Inventor: Klodian Belegu, Toms River, NJ (US)

( * ) Notice: Subject to any disclaimer, the term of this patent is extended or adjusted under 35 U.S.C. 154(b) by 0 days.

(21) Appl. No.: 14/858,152

(22) Filed: Sep. 18, 2015

(65) Prior Publication Data

US 2016/0082902 A1 Mar. 24, 2016

Related U.S. Application Data

(60) Provisional application No. 62/052,192, filed on Sep. 18, 2014.

(51) Int. Cl.
| | | |
|---|---|---|
| *B60R 13/10* | (2006.01) | |
| *G08B 5/36* | (2006.01) | |
| *G08G 1/017* | (2006.01) | |
| *G07C 5/00* | (2006.01) | |

(52) U.S. Cl.
CPC .............. *B60R 13/10* (2013.01); *G07C 5/008* (2013.01); *G08B 5/36* (2013.01); *G08G 1/017* (2013.01)

(58) Field of Classification Search
CPC .......... B60R 13/10; G08B 5/36; G08G 1/017; G07C 5/008
See application file for complete search history.

(56) References Cited

U.S. PATENT DOCUMENTS

| | | |
|---|---|---|
| 5,105,179 A | 4/1992 | Smith |
| 5,276,728 A | 1/1994 | Pagliaroli et al. |
| 6,124,783 A | 9/2000 | Alexander |
| 6,359,570 B1 | 3/2002 | Adcox et al. |
| 6,366,222 B1 | 4/2002 | Russell, Jr. |
| 6,404,327 B1 | 6/2002 | Naddeo |
| 7,096,102 B1 | 8/2006 | Parker, Sr. |
| 7,142,104 B1 | 11/2006 | Blueford |
| 7,800,484 B2 | 9/2010 | Wang |
| 8,754,751 B1 * | 6/2014 | Picolli ..................... G01S 13/75 340/10.1 |
| 2002/0021210 A1 | 2/2002 | Naddeo |
| 2004/0004539 A1 | 1/2004 | Collins |
| 2007/0008084 A1 | 1/2007 | Wu et al. |
| 2008/0117032 A1 | 5/2008 | Dillon |
| 2008/0258938 A1 | 10/2008 | Moon |
| 2009/0109023 A1 * | 4/2009 | Newman ............... B60R 25/104 340/540 |
| 2009/0288320 A1 * | 11/2009 | El Emam ................ B60R 13/10 40/200 |
| 2011/0078933 A1 * | 4/2011 | Lukawitz ............... B60Q 1/503 40/204 |
| 2011/0291822 A1 | 12/2011 | Boston et al. |
| 2013/0093886 A1 * | 4/2013 | Rothschild ........... G08G 1/0175 348/148 |
| 2014/0022066 A1 | 1/2014 | Richardson |
| 2014/0090280 A1 | 4/2014 | Cunningham |

* cited by examiner

*Primary Examiner* — Mohamed Barakat
(74) *Attorney, Agent, or Firm* — Doherty IP Law Group LLC

(57) ABSTRACT

An electronic license plate for a vehicle includes a base mounted on a vehicle, the base including wireless communication for receiving data from a monitoring system, a visual display screen connected to the base for displaying indicia, and a microprocessor in communication with the visual display screen for processing the data received from the monitoring system and changing the indicia displayed on the visual display screen to alert third parties of a potential violation.

18 Claims, 1 Drawing Sheet

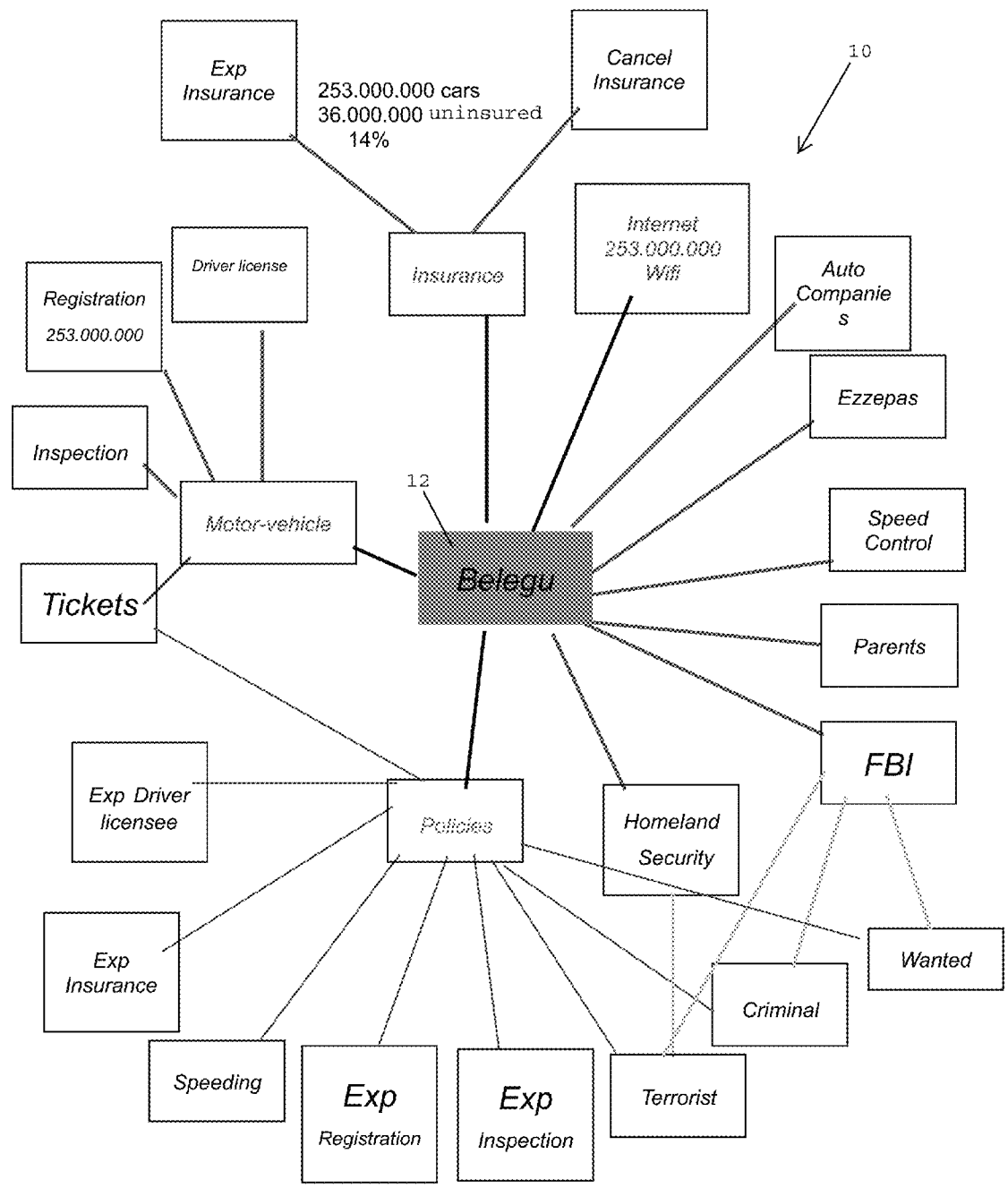

ELECTRONIC LICENSE PLATES FOR VEHICLES

CROSS-REFERENCE TO RELATED APPLICATIONS

The present patent application claims benefit of U.S. Provisional Application Ser. No. 62/052,192, filed Sep. 18, 2014, the disclosure of which is hereby incorporated by reference herein.

BACKGROUND OF THE INVENTION

Field of the Invention

The present application is directed to license plates and is more specifically directed to electronic license plates that change appearance and/or color(s) to alert authorities that the car and/or driver is violating one or more laws, rules, regulations, requirements, etc.

SUMMARY OF THE INVENTION

In one embodiment, the electronic license plate is affixed to a car. The electronic license plate is dynamic so that it is capable of changing appearance and/or color. The electronic license plate may include various illuminating elements such as lights, LEDs, video screens, and/or pixels. In one embodiment, the electronic license plate includes an electronic tablet, such as an electronic tablet sold under the trademark iPad. In one embodiment, the electronic license plate is manufactured and mounted onto a vehicle by a vehicle manufacturer so that the electronic license plate is permanently affixed to the vehicle.

These and other preferred embodiments of the present invention will be described in more detail below.

BRIEF DESCRIPTION OF THE DRAWING

The FIGURE shows a monitoring system including an electronic license plate that is mounted on a vehicle, in accordance with one embodiment of the present invention.

DETAILED DESCRIPTION

In one embodiment, the electronic license plate is affixed to a car. The electronic license plate is dynamic so that it is capable of changing appearance and/or color. The electronic license plate may include various illuminating elements such as lights, LEDs, video screens, and/or pixels. In one embodiment, the electronic license plate includes an electronic tablet, such as an electronic tablet sold under the trademark iPad. In one embodiment, the electronic license plate is manufactured and mounted onto a vehicle by a vehicle manufacturer so that the electronic license plate is permanently affixed to the vehicle.

In one embodiment, the electronic license plate includes wireless communication such as WiFi, satellite, the Cloud, microwave, or cell phone communication technology. The electronic license plate is desirably affixed to a vehicle, such as a truck or automobile, which may also have on-board wireless communication capabilities. The electronic license plate and the vehicle may be in wireless communication with one another.

In one embodiment, the electronic license plate is part of a monitoring system that alerts third parties such as law enforcement personnel that a vehicle or its driver are currently in violation of a law, rule, regulation, requirement or contract provision, or that there is some sort of deficiency associated with the vehicle and/or driver.

In one embodiment, the monitoring system collects data from various organizations including law enforcement agencies, the CIA, the FBI, the NSA, Department of Homeland Security, state police, county police, local police, insurance companies, the Motor Vehicle Commission, credit agencies, banks, financial institutions, the State Department, internet companies, retail companies, the court system, Interpol, debt collection agencies, child welfare agencies, automobile manufacturers and the like. The data collected indicates if a driver and/or vehicle bearing the electronic license plate has any deficiencies or liabilities.

In one embodiment, a driver has an expired driver's license. The monitoring system provides this data to the electronic license plate and the electronic license plate changes appearance or color to alert third parties that a car or driver has an expired license. In one embodiment, the electronic license plate changes color, e.g., the license plate turns red.

In one embodiment, a shooting occurs in a particular area. The monitoring system uses GPS to identify all of the cars that are in the particular area and all of the electronic license plates on the cars in the particular area change appearance and/or to notify law enforcement that a car may be a "potential suspect car." Law enforcement can then stop the potential suspect cars to identify the shooter.

The database may include any information that law enforcement may need to maintain public safety and road safety.

In one embodiment, insurance for a vehicle expires. The monitoring system is notified by insurance companies that the insurance has expired. The monitoring system changes the appearance and/or color of the electronic license plate on the vehicle having expired insurance.

The electronic license plate may change appearance and/or color to provide an Amber alert, a Silver alert, any type of public safety alert, or that a vehicle has been stolen.

In one embodiment, the monitoring system may change the appearance and/or color of the electronic license plate to indicate that a driver has a violation or has expired insurance.

In one embodiment, different colors may be used to indicate different types of violations, problems, or conditions.

In one embodiment, law enforcement may have a video monitor in a law enforcement vehicle. The video monitor provides information on all vehicles passing in the vicinity of the law enforcement vehicle. The electronic license plates send wireless information to receivers on the law enforcement vehicle. If a vehicle passing by the law enforcement vehicle has a violation or deficiency, the monitoring system changes the color of the video monitor to alert law enforcement personnel of a potential violation. Law enforcement personnel may then interact with the video monitor to obtain additional information on a suspect vehicle.

The FIGURE shows a monitoring system 10 including an electronic license plate 12 that is mounted on a vehicle. The monitoring system includes various sources of information that form a database of information. The monitoring system 10 changes the color and/or appearance of the license plate if the database indicates that a violation exists.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. An electronic license plate comprising:
a base having wireless communication for receiving data;
a display screen connected to said base;
a microprocessor in communication with said display screen for processing the data and changing indicia appearing on said display screen in response to the data received by said base, wherein said electronic license plate is integrated into a monitoring system adapted to alert third parties or law enforcement personnel that a vehicle or a driver of the vehicle are currently in violation of a law, rule, regulation, requirement or contract provision, or that there is a deficiency associated with the vehicle and the driver, and wherein said monitoring system uses GPS to identify all of the vehicles that are in the particular area and all of said electronic license plates on the vehicles in the particular area change appearance to notify third parties or law enforcement.

2. The electronic license plate as claimed in claim 1, wherein the changing indicia is selected from the group consisting of alphanumerics, symbols and colors.

3. The electronic license plate as claimed in claim 1, wherein said display screen comprises illuminating elements, lights, LEDs, video screens, or pixels.

4. The electronic license plate as claimed in claim 1, wherein said electronic license plate comprises an electronic tablet or a unit that is permanently mounted on a vehicle.

5. The electronic license plate as claimed in claim 1, wherein said wireless communication comprises WiFi, satellite, the Cloud, microwave, infrared or cell phone communication technology.

6. The electronic license plate as claimed in claim 1, wherein said electronic license plate is in wireless communication with a vehicle.

7. The electronic license plate as claimed in claim 1, wherein said monitoring system comprises data collected from organizations selected from the group consisting of law enforcement agencies, the CIA, the FBI, the NSA, Department of Homeland Security, state police, county police, local police, insurance companies, the Motor Vehicle Commission, credit agencies, banks, financial institutions, the State Department, internet companies, retail companies, the court system, Interpol, debt collection agencies, child welfare agencies, and automobile manufacturers.

8. The electronic license plate as claimed in claim 7, wherein the data collected in said monitoring system indicates if the vehicle bearing said electronic license plate or the driver of the vehicle has any deficiencies or liabilities.

9. The electronic license plate as claimed in claim 8, wherein if the driver has an expired license said monitoring system provides the data to said electronic license plate and said electronic license plate changes appearance or color to alert third parties that a vehicle or the driver has an expired license.

10. The electronic license plate as claimed in claim 9, wherein said electronic license plate turns red when the indicia changes.

11. The electronic license plate as claimed in claim 1, wherein the data includes public safety information and road safety information.

12. The electronic license plate as claimed in claim 1, wherein said monitoring system receives the data from insurance companies to indicate the insurance status for a vehicle, and wherein said monitoring system changes the appearance or color of said electronic license plate on any vehicle having expired insurance.

13. The electronic license plate as claimed in claim 1, wherein said monitoring system comprises Amber alert data, Silver alert data, public safety alert data, or stolen vehicle alert data.

14. The electronic license plate as claimed in claim 1, further comprising:
a law enforcement vehicle having a video monitor that provides information on all vehicles passing in the vicinity of the law enforcement vehicle, wherein electronic license plates on said vehicles passing in the vicinity of the law enforcement vehicle send wireless information to receivers on the law enforcement vehicle.

15. The electronic license plate as claimed in claim 14, wherein if a vehicle passing by the law enforcement vehicle has a violation or deficiency, said monitoring system changes the color of said video monitor in the law enforcement vehicle to alert law enforcement personnel of a suspect vehicle having a potential violation.

16. The electronic license plate as claimed in claim 15, wherein said law enforcement personnel interact with said video monitor to obtain additional information on the suspect vehicle.

17. An electronic license plate for a vehicle comprising:
a base mounted on a vehicle;
said base comprising wireless communication for receiving data from a monitoring system;
a visual display screen connected to said base for displaying indicia;
a microprocessor in communication with said visual display screen for processing the data received from said monitoring system and changing the indicia displayed on said visual display screen to alert third parties of a potential violation of a law, rule, regulation, requirement or contract, wherein said monitoring system is adapted to alert third parties or law enforcement personnel that a vehicle or a driver of the vehicle are currently in violation of a law, rule, regulation, requirement or contract provision, or that there is a deficiency associated with the vehicle and the driver, and wherein said monitoring system uses GPS to identify all of the vehicles that are in the particular area and all of said electronic license plates on the vehicles in the particular area change appearance to notify third parties or law enforcement.

18. The electronic license plate as claimed in claim 17, wherein said monitoring system comprises data collected from organizations selected from the group consisting of law enforcement agencies, the CIA, the FBI, the NSA, Department of Homeland Security, state police, county police, local police, insurance companies, the Motor Vehicle Commission, credit agencies, banks, financial institutions, the State Department, internet companies, retail companies, the court system, Interpol, debt collection agencies, child welfare agencies, and automobile manufacturers.

* * * * *